Jan. 29, 1924.
M. POSER
1,481,926
OPHTHALMIC TEST LENS FRAME
Original Filed March 15, 1916    2 Sheets-Sheet 1
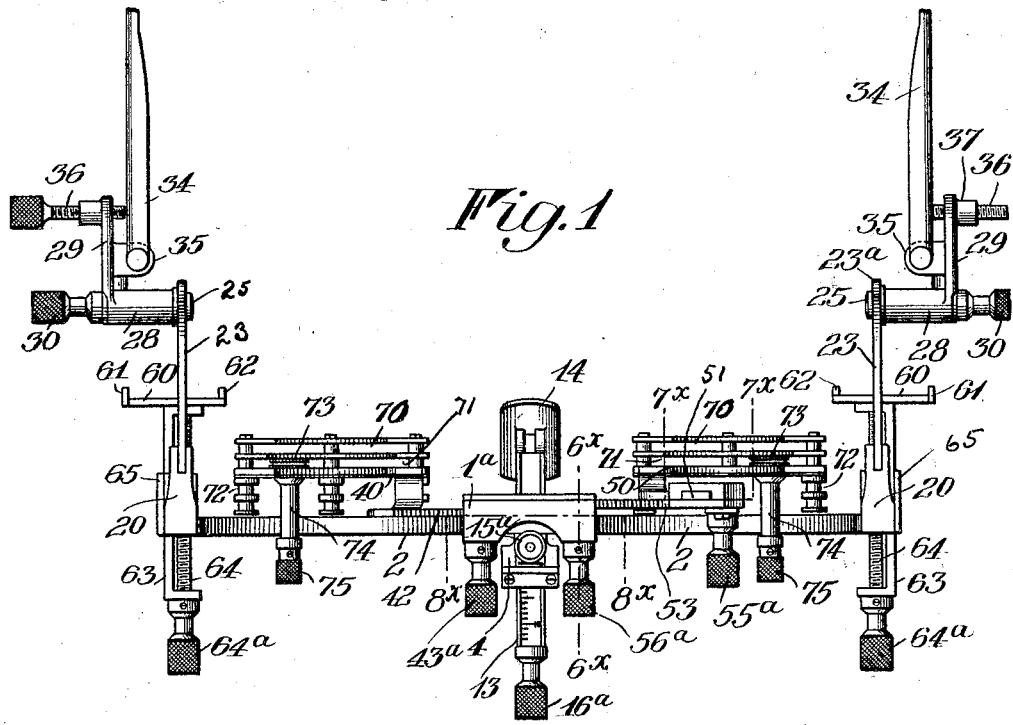
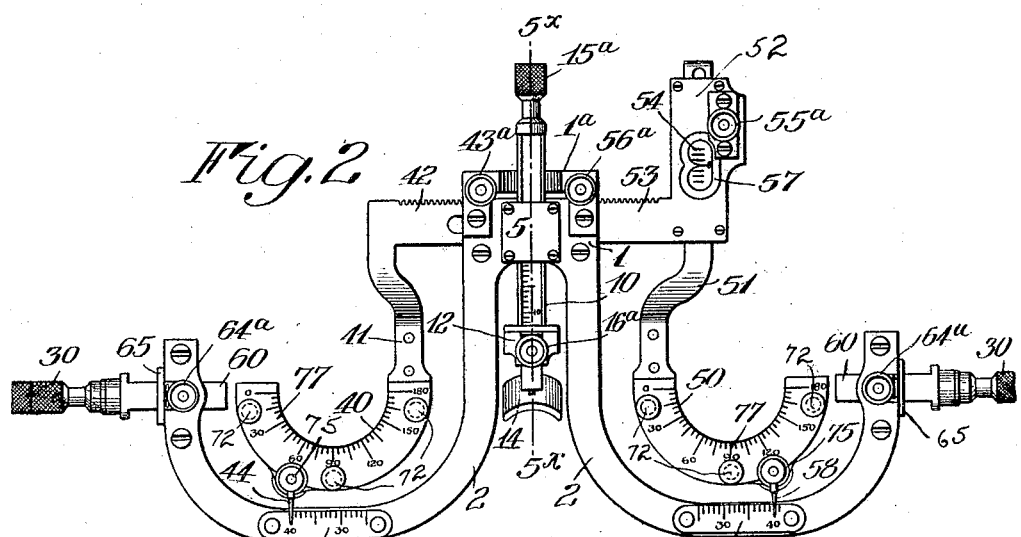
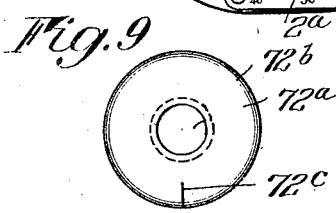
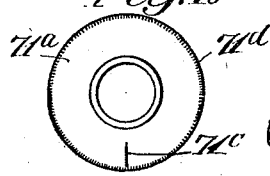
INVENTOR
Max Poser
BY
his ATTORNEYS Jan. 29, 1924.
M. POSER
1,481,926
OPHTHALMIC TEST LENS FRAME
Original Filed March 15, 1916   2 Sheets-Sheet 2
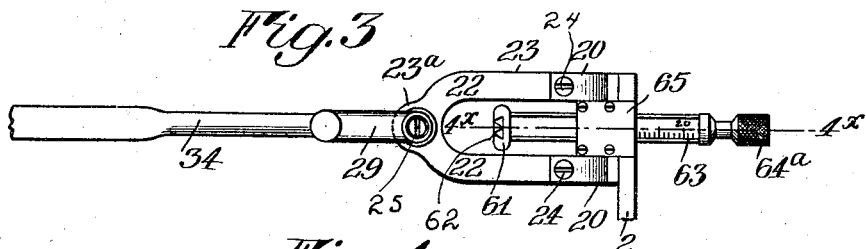
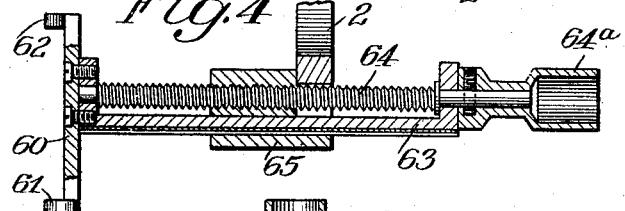
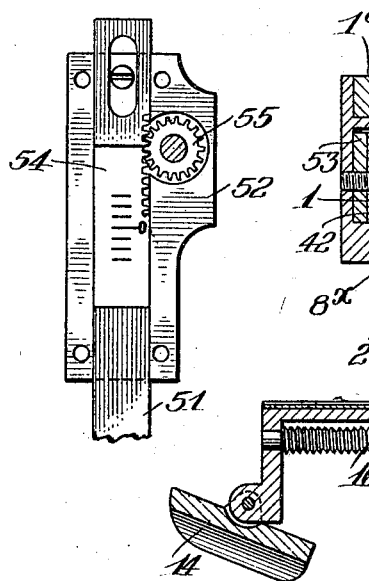
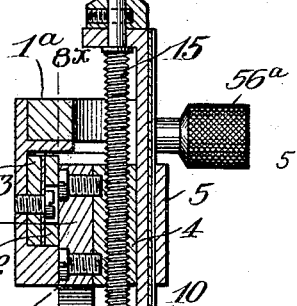
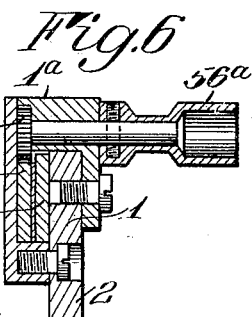
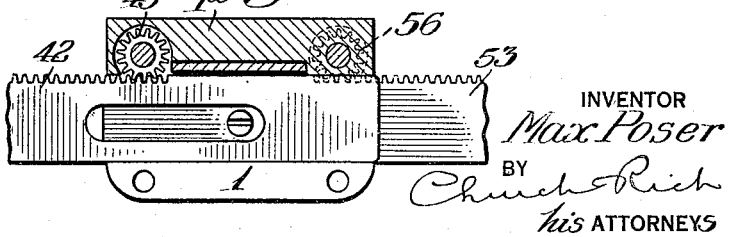
INVENTOR
*Max Poser*
BY
*Church Rich*
*his* ATTORNEYS Patented Jan. 29, 1924.

1,481,926

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC-TEST-LENS FRAME.

Original application filed March 15, 1916, Serial No. 84,358. Divided and this application filed January 13, 1919. Serial No. 270,794.

*To all whom it may concern:*

Be it known that I, MAX POSER, a subject of the Grand Duke of Saxon Weimar, residing at Rochester, in the county of Monroe and State of New York, have invented certain new and useful Improvements in Ophthalmic-Test-Lens Frames; and I do declare the following to be a full, clear, and exact description of the same, reference being had to the accompanying drawings, forming a part of this specification, and to the characters of reference marked thereon.

My invention relates to apparatus for optical purposes and used in testing the refraction of a patient's eyes and obtaining the necessary data for fitting eyeglasses. More particularly my invention relates to a test lens frame that is portable and that is to be supported in position before a patient's eyes by means of a nosepiece resting on the patient's nose and a pair of temples by which the device is held in position. The present invention is a division of my former application filed Mar. 15, 1916, Serial No. 84,358 for ophthalmic test lens frames.

The object of my invention is to provide a test lens frame wherein after all adjustments have been made and the patient's eyes have been satisfactorily refracted all the readings may be taken without disarranging any of the adjustments or removing any of the trial lenses. Another object of my invention is to provide two independent adjustments for the frame supporting nosepiece, one in a vertical direction and one in a horizontal direction extending in the general direction of the line of vision of the patient to whom the apparatus is applied, whereby the apparatus may readily be accommodated to those variations of facial features met with in different patients which variations involve the shape of the nose, the length of the eyelashes and the depth of the eye sockets.

In the drawings:

Figure 1 is a plan view of a test lens frame constructed according to my invention, Figure 2 is a front elevation of the same, Figure 3 is a side elevation with parts broken away, Figure 4 is a section on the line $4^x$—$4^x$ of Figure 3, Figure 5 is a section on the line $5^x$—$5^x$ of Figure 2 showing the adjustments of the nosepiece.

Figure 6 is a section on line $6^x$—$6^x$ of Figure 1,

Figure 7 is a section on the line $7^x$—$7^x$ of Fig. 1,

Figure 8 is a section on line $8^x$—$8^x$ Figure 1, and

Figures 9 and 10 are plan views of a prism lens mount and a cylinder lens mount respectively adapted to be used with my test lens frame.

Similar reference numerals refer to the same parts throughout the figures of the drawings.

In the preferred embodiment of my invention a foundation frame, comprising a central bridge member $1^a$ is secured to a rigid central head 1 and two U-shaped rigidly fastened arms 2, 2, extend laterally, one from the righthand side and one from the left-hand side of the head 1. In the front face of a boss 4 which projects forwardly from the head 1, is formed a channel in which slides the vertical graduated nosepiece bar 10 which is held in said channel by a cap plate 5. To the lower end of the bar 10 is secured the block 12 in which is slidably mounted the horizontal graduated nosepiece bar 13 on the rear end of which is hinged, so as to be movable in a vertical plane, the nosepiece proper 14. By means of a screw 15 tapped in a threaded opening in the boss 4 and having a knurled fingerpiece $15^a$, the nosepiece may be raised or lowered and by means of the screw 16 threaded in the block 12 and having a knurled fingerpiece $16^a$ it may be adjusted inwardly or outwardly to meet the characteristics of the patient's facial features. The graduations on the vertical and horizontal bars 10 and 13 afford a convenient means whereby the adjusted position of the nosepiece may be accurately read.

Two slotted brackets 20, 20, are secured to the rear face of the outer ends of each of the arms 2 by means of screws, and a U-shaped temple spring 23 of resilient material is secured to each pair of brackets 20 at the spring arms 22 which fit in the slotted portions of said brackets and are rigidly held therein by the screws 24. The closed end of each of the springs 23 is provided with an ear or extension 23ª within which is threaded a stud 25. Upon each of the studs 25 is mounted a hub 28 carrying an integral rearwardly projecting arm 29, and the outer end of the stud 25 is threaded and receives a nut 30 between which and the arm 23 the hub 28 is clamped. By loosening the nut 30 the arm 29 may be adjusted angularly with relation to the spring 23, and the desired positions of adjustment maintained by tightening the nut 30.

A pair of temples 34 cooperate with the nosepiece 14 to hold the apparatus before the patient's eyes. The nosepiece serves to locate and support the foundation frame bodily, while the temples, which are hinged to the lugs 35, formed on the arms 29, are clamped to the patient's head by means of set screws 36 which are threaded in the bosses 37 on the rear end of arms 29, thus the temples position the foundation frame and hold it to the patient's head.

The portion of the apparatus thus far described relates to the foundation frame and the means for securing said frame before the eyes of the patient. Carrying members 40 and 50 are provided for the trial lenses which are mounted so as to be laterally adjustable within the rigid upper portion of the head 1 of the foundation frame. This lateral adjustment is for the purpose of accommodating the trial lens carriers independently to various lateral distances between a patient's nose and the pupil of each of his eyes. The vertical adjustment of the trial lens carrying members 40, 50, is effected first by means of the screw 15 which raises or lowers the frame body with relation to both of the patient's eyes, this adjustment being for the purpose of bringing the trial lens carrier 40 in alinement with the patient's right eye. An additional independent vertical adjustment is provided for adjusting the trial lens carrier 50 with relation to the patient's left eye and thus the instrument is readily accommodated to those patients whose eyes do not lie normally in the same horizontal plane.

In carrying out these features of my invention, I preferably fix the trial lens carrier 40 to a bar 41 depending from a laterally movable slide 42 which is mounted in the head 1. A rack and pinion adjustment operated by the pinion 43 mounted on a shaft having a fingerpiece 43ª is provided as a convenient means for effecting a lateral adjustment of the member 40. The left eye trial lens carrier 50 is fixed to a bar 51 which terminates at its upper end in a graduated slide 54, mounted in a vertical slideway member 52 the latter being partly formed integral with the horizontal slide 53 which in turn is mounted in a horizontal slideway in the head 1. The vertical slide 54 and the horizontal slide 53 are each provided with a rack and pinion adjustment, the pinion 55 mounted on a shaft having a fingerpiece 55ª providing a convenient means for independently adjusting the carrier 50 vertically, while the pinion 56 mounted on a shaft having a fingerpiece 50ª provides a convenient means for independently adjusting said carrier 50 laterally.

In the forward face of the slideway 52 is formed a bevel sided aperture 57 which reveals the graduations formed on the front face of the vertical slide 54. The horizontal mark or pointer on the left vertical side of the beveled aperture, see Figure 2, provides an index with which the scale on the slide 54 cooperates, whereby the extent of elevation or depression of the trial lens carrier 50 relatively to a normal position is indicated. For indicating the lateral position of the patient's pupils with relation to the bridge of the nose and with relation to each other, a pair of depending pointers 44 and 58 are provided, one on the forward face of each of the trial lens carriers 40, 50, as best shown in Figure 2.

The pointers cooperate with a pair of scales 2ª secured to the forward faces of the arms 2. By means of the pointers 44 and 58 and their cooperating scales 2ª, the lateral location of the patient's pupils from the center of the bridge of the nose may be read directly.

For measuring the distance between the cornea of either of the patient's eyes and the vertex of the adjacent surface of a trial lens placed immediately before either eye, a sighting device mounted on a graduated slide bar, is provided for each eye. By this means, if the apex of the cornea of either eye is properly sighted, the distance from said cornea to the respective lens vertex will be measured by the scale on the slide bar. To this end I provide the sight bars 60 each of which carries a pair of cooperating sights namely; a sight 61 at its outer end and a sight 62 at its inner end. The sight 61 is a dovetailed slot and the sight 62 is a cooperating angular projection, as shown in Figure 3. Each sight bar 60 is carried on the rear end of a graduated slide bar 63 and is adjustable forwardly and backwardly by means of the screws 64 having a knurled fingerpiece 64ª. The slides 63 are each mounted in a recess formed in a boss extending rearwardly from the respective arms 2, and held in said recess by a plate 65, relatively to which the scale at the lower edge of the slide 63 may be read. The position of the sight bars 60 is such that they lie in the same horizontal plane as the eyes of the patient and the arrangement of the temple springs 23 relative to the sight bar 60 and a slide 63 is such that the sighting bar is readily accommodated between the arms 22 of the temple springs 23. In using the sighting device for measuring the distance between respective corneas and trial lenses, it is merely necessary to bring into alinement the apex of the respective cornea and the adjacent pair of sights 61, 62, which is easily effected by means of the screws 64, when the distance from the apex of either cornea to the vertex of its respective trial lens may be read directly from the scale on the slide bar 63. The graduations on the slide 63 are so arranged that, when the graduations register zero, the line of sight will be coincident with that vertex of the spherical lens which faces the patient's eye which in this case is the vertex of the concave side.

Each of the trial lens carrying members comprises three downwardly curved spaced walls supported on studs 72, so as to form a rear pocket 70 for a spherical lens in its mount and an intermediate pocket 71 for a cylindrical lens in its mount and a pocket formed by depressions in the studs 72 for carrying a prism lens in its mount.

The cylindrical trial lens mount comprises a disk $71^a$ in which a cylindrical lens is mounted with its longitudinal axis indicated by an index line $71^c$. The periphery of the disk $71^a$ is provided with a series of transverse knurled corrugations designed to cooperate with a small knurled pinion 73 on the lens carrier adapted to rotate the disk $71^a$ as hereinafter pointed out. The prism lens mount $72^a$ is prepared by cementing the lens on a transparent mounting which may be made of celluloid. The position of the base of the prism trail lens is indicated by an index $72^c$ formed on the mount perpendicular to the base of the prism lens.

The eyes of the patient are refracted in usual manner, using if required a set of spherical trial lenses set in mounts which are adapted to be interchangeably substituted in the carrier pockets 70 in the usual manner. The cylindrical trial lenses set in mounts $71^a$ are inserted in the pockets 71, when the knurled periphery $71^d$ of the mount rests upon the knurled pinion 73 which is journaled in the boss 74, formed integral with the front portion of the trail lens holders 40 and 50. A knob 75 is provided for rotating each pinion 73. The knurling of the pinion 73 and the knurling of the periphery of the cylinder lens mount correspond so that a transversely corrugated periphery of the knurled wheel 73 meshes with the knurled corrugation $71^d$ of the lens mount $71^a$, the pinion 73 and the lens mount $71^a$ cooperating in the manner of a pinion and gear. A scale 77 is provided on the front wall of each lens carrier pocket 71 and with this scale the index mark $71^c$ on the cylindrical lens mount cooperates, whereby the position of the axis of a patient's astigmatism may be readily ascertained. when prismatic refraction is required, a prism lens in a transparent mounting as described is adapted to be placed in the pocket forming depressions in the carrier studs 72 and after the proper position of the prism base has been found, which is readily done by rotating the mount, the position on the base may be conveniently read through the transparent mount $72^b$ since its index mark $72^c$ then overlies the scale 77 on the trial lens carrier.

Having described my invention what I claim and desire to secure by Letters Patent is:

1. In an optical apparatus for testing eyes, the combination of a rigid head, a nose piece adjustable on said head, means for adjusting the nose piece on the head for positioning the apparatus in the proper horizontal plane before a patient's eyes, means for indicating the adjustment of the nosepiece, a pair of trial lens carriers laterally adjustable on said head, means for indicating the lateral position of said carriers, means for adjusting one of said carriers vertically, means for indicating the vertical adjustment thereof, a pair of curved arms extending downwardly and laterally from said rigid head, a pair of flexible temples adjustably connected to said curved arms, means on said curved arms for measuring the distance between the cornea of a patient's eye and the vertex of the adjacent surface of a trial lens in the carrier, and a scale on each of the carriers adapted to cooperate with an index on a trial lens mount, the arrangement being such that when all adjustments have been made all readings may be taken without disarranging any of the adjustments or removing the trial lenses.

2. In an ophthalmic test lens frame, the combination with a head piece, of a plurality of trial lens holders, a nose piece, a horizontally adjustable member pivotally supporting said nose piece, a device supporting said member for horizontal adjustment, and means for adjusting said device vertically.

3. In an ophthalmic test lens frame, the combination with a head piece, of a plurality of trial lens holders provided thereon, a nose piece for supporting said head piece, means for both adjusting and indicating the lateral displacement of the trial lens holders for each eye relative to said nose piece, means for both adjusting and indicating the vertical adjustment of the nose piece relative to the head piece and trial lens holders, and means for adjusting and indicating the displacement of the holders for both eyes front or back of the nose piece.

4. In an optical apparatus for testing eyes, the combination of a rigid head, a pair of downwardly and outwardly extending arms secured thereto, a pair of flexible temples secured to said arms, a pair of trial lens carriers adjustably supported on said head, a nosepiece cooperating with said temples to support the apparatus on a patient's head and separate means for adjusting the nosepiece vertically and horizontally to vary the position of the apparatus and bring the trial lens carriers into proper relation with a patient's eyes, and means for indicating the extent of both the vertical and horizontal adjustment of the nosepiece.

5. In an optical apparatus for testing eyes, the combination of a rigid head, a pair of downwardly and outwardly extending arms secured thereto, a pair of flexible temples secured to said arms, a pair of trial lens carriers adjustably supported on said head, a nosepiece cooperating with said temples to support the apparatus on a patient's head, a horizontally adjustable bar on which the nosepiece is mounted, and a bar slidably mounted in said head and vertically adjustable therein and by which said first mentioned bar is carried.

6. The combination with an ophthalmic test lens frame as claimed in claim 3, of a cornea gauge adjustably connected with said trial lens holders for indicating the distance between the eye and a trial lens.

7. The combination with an ophthalmic test lens frame as claimed in claim 3, of a cornea gauge adjustable in the head piece and means associated therewith for indicating the distance between the eye and trial lens holder.

MAX POSER.